United States Patent [19]

Bergholz

[11] Patent Number: 4,479,621
[45] Date of Patent: Oct. 30, 1984

[54] FLOOR CONSTRUCTION FOR THE UPPER COMPARTMENT OF AN AIRCRAFT

[75] Inventor: Helmut Bergholz, Byandung/Indoneslen, Fed. Rep. of Germany

[73] Assignee: Messerschmitt-BUMO/o/lkow-Blohm G.m.b.H., Munich, Fed. Rep. of Germany

[21] Appl. No.: 435,417

[22] Filed: Oct. 20, 1982

[30] Foreign Application Priority Data

Oct. 22, 1981 [DE] Fed. Rep. of Germany ....... 3141869

[51] Int. Cl.³ .............................................. B64C 1/18
[52] U.S. Cl. ............................ 244/117 R; 244/118.1
[58] Field of Search .................. 244/117 R, 119, 120, 244/123, 131, 133, 118.1, 118.5, 118.6; 105/370, 372, 375, 422; 52/806, 169.9, 299, 167; 410/105

[56] References Cited

U.S. PATENT DOCUMENTS

| | | | |
|---|---|---|---|
| 1,549,721 | 8/1925 | Kraft | 244/131 |
| 1,892,070 | 12/1932 | Miller | 244/119 |
| 3,110,464 | 11/1963 | Baratoff et al. | 52/167 |
| 3,155,348 | 11/1964 | Ricard | 244/119 |
| 3,338,203 | 8/1967 | Moore | 244/119 |
| 3,462,330 | 8/1969 | Greig et al. | 244/133 |
| 3,779,487 | 12/1973 | Ashten et al. | 244/123 |
| 4,185,799 | 1/1980 | Richards, Jr. | 410/105 |
| 4,229,919 | 10/1980 | Hughes | 52/299 |
| 4,344,995 | 8/1982 | Hammer | 244/117 R |

FOREIGN PATENT DOCUMENTS 161389 2/1955 Australia .......................... 244/118.5

OTHER PUBLICATIONS

Dornier, published U.S. S.N. 283962, 5-1943.
*Flight* International, Dec. 4, 1976, pp. 1644-1650, 1659.

*Primary Examiner*—Galen L. Barefoot

[57] ABSTRACT

A floor construction for the upper compartment of an aircraft having an about circular fuselage cross-section. A one piece floor plate provides bending supports and extends over nearly the full inner diameter of the fuselage. A connection is provided between the edge of the floor plate and the fuselage outer structure for transmitting forces directed predominantly in the longitudinal direction of the aircraft. Vertically running planar structural members provide side support elements for the floor plate. The construction results in a decrease of the construction weight as well as of the costs, in particular if the floor plates are provided from fiber reinforced plastic. The connection between the floor plates and the fuselage frame can be provided by rods running at an angle forwardly, which transmit preferably forces acting in the longitudinal direction of the aircraft.

21 Claims, 24 Drawing Figures

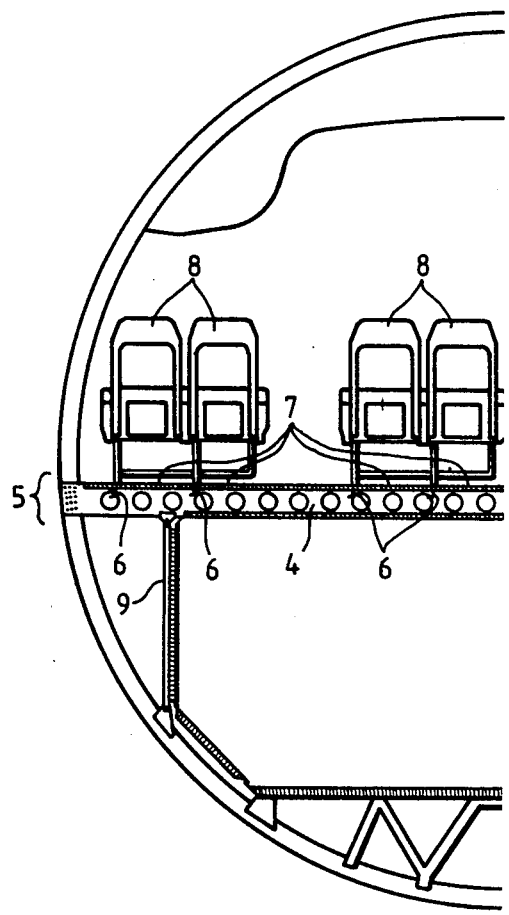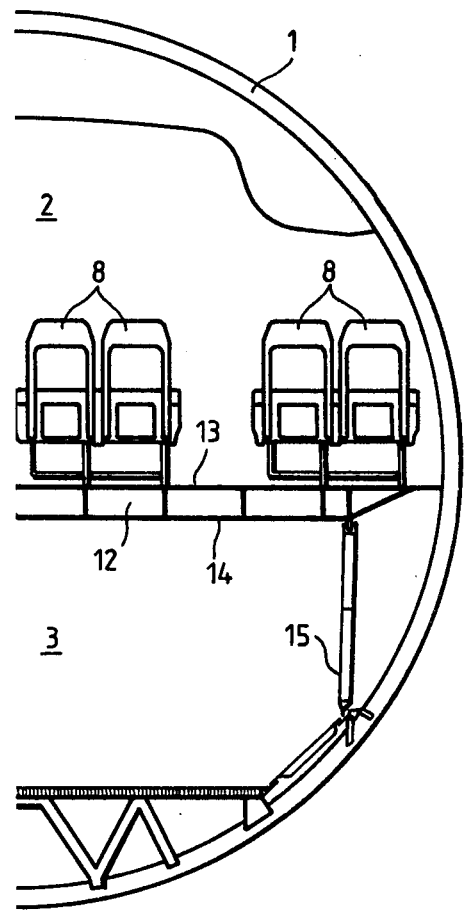
FIG. 1A
PRIOR ART
FIG. 1

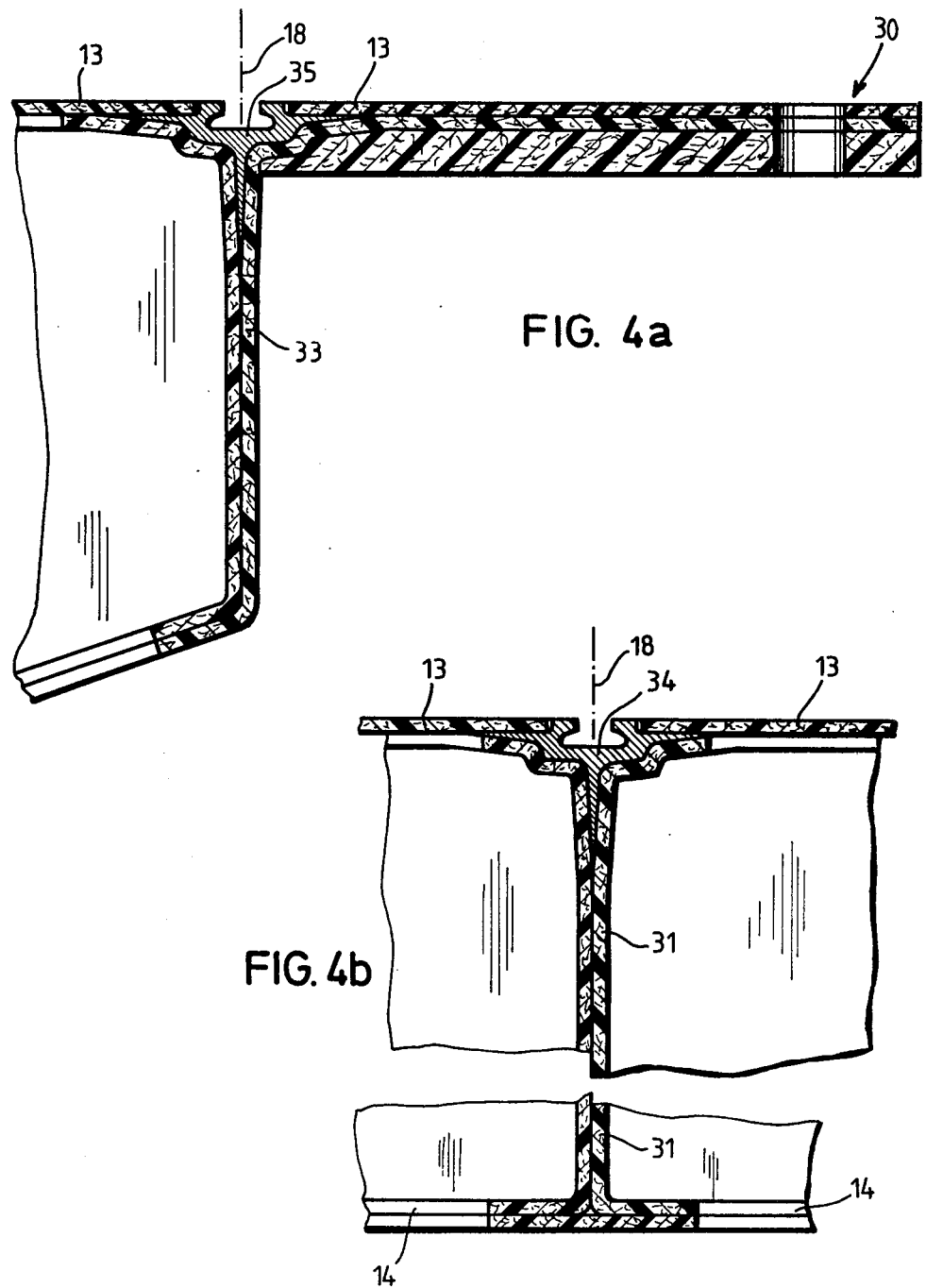

FLOOR CONSTRUCTION FOR THE UPPER COMPARTMENT OF AN AIRCRAFT

DESCRIPTION

BACKGROUND OF THE INVENTION

1. Field of the Invention

The present invention relates to a floor construction for the upper compartment of an aircraft having a fuselage with approximately circular cross-section, which comprises mainly bending supports supported on their sides by support elements and running cross to the longitudinal of the fuselage.

2. Brief Description of the Background of the Invention Including Prior Art

The inner structure of the fuselage of in particular large capacity aircraft comprises substantially a first floor of an upper loading compartment and a second floor of a lower loading compartment as well as the side walls of the lower load compartment, where in most cases the upper load compartment serves as a space for passengers and the lower load compartment as a space for freight. The upper floor rests on horizontal cross support pieces, which are disposed approximately diametrical within the nearly circular fuselage frame. The ends of the cross support pieces are solidly connected to the web of the fuselage frame in each case for example by way of a rivet. Longitudinal profiles or rails are running above the cross support pieces of in general I-shaped cross-section and are formed with the cross support pieces via braces to a metal frame. Light construction honeycomb plates are inserted as floor elements into the fields of this frame, which consist of fiber reinforced plastic and which are bolted or screwed to the cross support pieces or respectively the longitudinal raisl. For increasing of the bending strength of the cross pieces these are close to their ends supported against the lower part of the fuselage frame in each case. The light construction honeycomb plates consisting of fiber reinforced plastic are screwed or bolted to the support rods serving as support elements, which light construction honeycomb plates form the side walls of the freight compartment. Corresponding light construction honeycomb plates are screwed or bolted from the freight compartment to the floor cross support pieces and thus form the sky of the freight compartment. In principle, the floor of the freight compartment is constructed similar to the floor of the passenger compartment. Based on the integrated loading provisions (ball mats) the floor plates are in part provided as light metal constructions. According to a principle recognizable from the known solutions, the floors of the passenger and of the freight compartment as well as the side walls of the latter are always constructed from supporting and surface forming elements.

Based on the rigid connection of the cross support pieces of the upper floor with the fuselage frame as well as based on its diametral disposition especially this floor is subjected to deformations, which the outer structure experiences based on loads becoming effective during the flight. The static consideration of the forces resulting therefrom is determining in part for the construction weight of the floor construction. Based on the complex formation of the individual construction groups thus fairly high construction costs results.

SUMMARY OF THE INVENTION

1. Purposes of the Invention

It is an object of the present invention to provide a floor construction for the upper loading compartment of an aircraft such that a clear decrease of the construction weight as well as of the production costs results.

It is another object of the present invention to provide a floor construction employing a small number of building blocks with a simpler construction.

It is a further object of the present invention to provide a method for the construction of a floor in an aircraft adapted to substantial and effective use of fiber reinforced plastics technology.

2. Brief Description of the Invention

The present invention provides a floor construction for the upper compartment of an aircraft having an about circular fuselage cross-section which comprises a one piece floor plate providing bending supports and extending over nearly the full inner diameter of the fuselage, a connection provided between the edge of the floor plate and the fuselage outer structure for transmitting forces directed predominantly in the longitudinal direction of the aircraft, and vertically running planar structural members providing side support elements for the floor plate.

The connection provided between an edge of the floor plate and the fuselage outer structure for transmitting forces directed predominantly in the longitudinal direction of the aircraft can comprise substantially rods, which rods can be connected via hinge points to the floor plate and to the fuselage outer structure. The connection between an edge of the floor plate and the fuselage outer structure can comprise a brace. The brace can have a forked end for bolting to an eye at the end of a floor plate. The connection between an edge of the floor plate and the fuselage outer structure can comprise sheet metal brackets.

The floor plates can comprise fiber reinforced plastics. The one piece floor plates extending nearly over the full diameter of the fuselage can be provided with rails running about parallel to the longitudinal axis of the fuselage. The one piece floor plates can be reinforced by longitudinal support pieces, by an edge support and by a terminal support piece reinforced by a lower girth. The floor plate can comprise a profile to rest on the planar structural members and the planar structural members can have a U-shaped profile at their upper end to engage the profile of the floor plate. A mushroom shaped sealing profile can provide a connection between adjoining sides of floor plates.

The planar structural members can be provided with a stiff rim at their lower end, which rim is attached to a longitudinal profile running from fuselage frame to fuselage frame. The floor plate can be supported by a truss core, by a tube core in combination with rigid foam, or by a core of balls in combination with rigid foam.

There is also provided a method where a vertically running planar structural member provides a side support element for a floor plate of the upper compartment. The one piece floor plates are placed onto the vertically running planar structural members where the floor plates provide bending supports and extend over nearly the full inner diameter of the fuselage. An edge of the floor plate and the fuselage outer structure are connected for transmitting forces directed predominantly in the longitudinal direction of the aircraft.

Rods can be connected as intermediary between the floor plate and the fuselage and the rods can be connected via hinge points to the fuselage outer structure. Braces provided as connection between the floor plate and the fuselage by way of forked ends can be engaged to eyes provided at the floor plate. A profile disposed at the bottom side of the floor plate can be set into a U-shaped profile at the upper end of the planar structural member. A mushroom shaped sealing profile can be placed as a connection between adjoining sides of floor plates. Stiff rims disposed at the lower end of the planar structural members can be attached to a longitudinal profile running from fuselage frame to fuselage frame.

The floor construction according to the present invention achieves a lower number of building groups, which in addition are exhibiting a substantially simpler construction resulting in a lower construction weight. Based on the invention there result in addition lower production, assembly and mounting costs of the respective building groups. The corresponding building parts can be produced substantially automatically by employing of essentially automatic production plants.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing in which are shown several of the various possible embodiments of the present invention:

FIG. 1 shows a schematic view of a cross-section of a fuselage with a comparison of the invention construction versus the state of the art, FIGS. 4a, 4b, 4c shows details from FIG. 4.

DESCRIPTION OF INVENTION AND PREFERRED EMBODIMENTS

Figure 2:
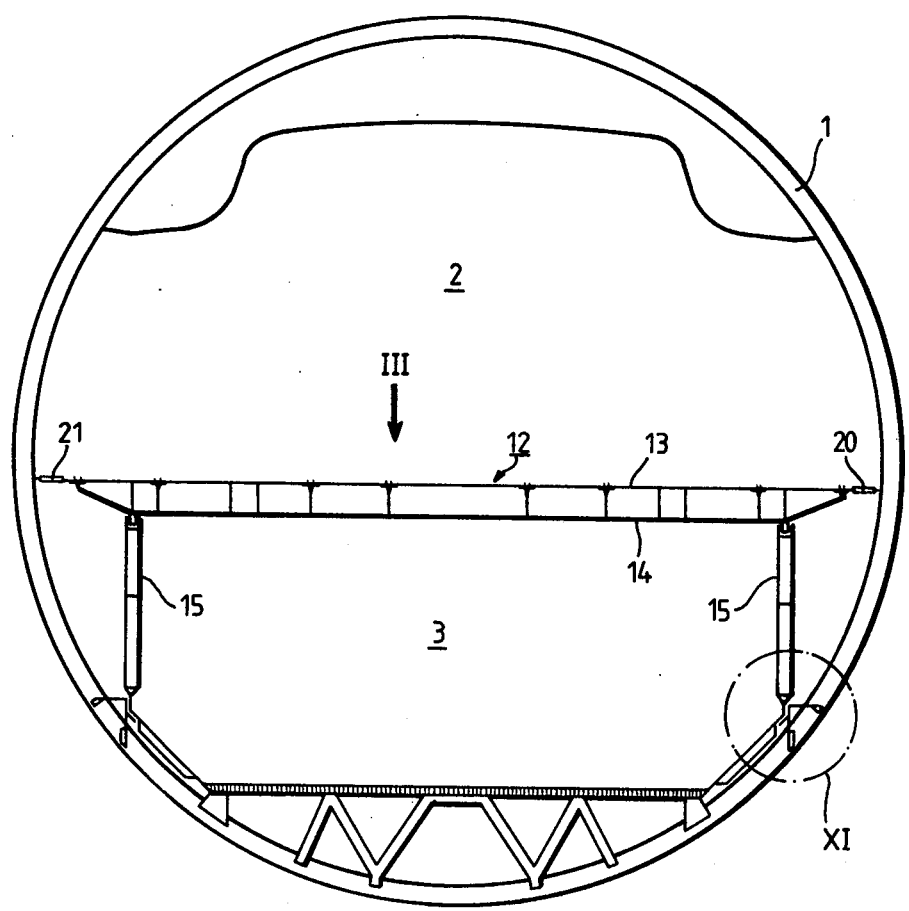
FIG. 2 shows a schematic view of a cross-section of a fuselage with a floor construction according to the invention.

In accordance with the present invention there is provided a floor construction for the upper loading compartment of an aircraft having a nearly circular cross-section and comprising substantially of bending bearers running in a cross direction relative the the fuselage and supported on the side as well as of support elements supporting the bending bearers. The bending bearers are formed as one piece floor plates 12. A connection is provided between the side edges of the floor plates 12 and the fuselage outer structure 1, whereby forces acting predominantly in the longitudinal direction of the aircraft are transmitted. The support elements supporting the floor plates 12 are formed as planar structural members 15 running vertically.

The connections between the floor plates 12 and the fuselage outer structure 1, which transmit substantially longitudinally directed forces, can be substantially provided by rods 20, 21, 51. The floor plates 12 can be connected on their left or right side via braces 19, via sheet metal brackets or fish plates 54 to the outer structure 1 of the fuselage. The floor plates 12 and/or the planar structural members 15 can be formed from fiber reinforced plastics.

FIG. 1 shows a comparison of the construction according to the present invention by way of a fuselage cross-section with the construction according to the state of the art, which comprises a fuselage outer structure 1, a passenger compartment 2 and a freight compartment 3. According to the conventional construction the passenger floor comprises cross support pieces 4, the ends of which are for example riveted at the location 5 to the fuselage frame piece in each case. The cross support pieces 4 form together with the support rails 6 running in longitudinal direction a frame, into which the floor elements are inserted and attached by way of screws or bolts. The longitudinal extenion of the floor element 7 usually amounts to three fuselage frame distances. The support rails 6 are provided at their upper longitudinal side with usual provisions for the attachment of passenger seats 8. The cross support pieces 4 are supported near their ends by way of support rods 9 such as for example light-metal pipes against the lower part of the corresponding fuselage frame. Thus the support rods 9 form a component of the floor construction and they support at the same time planar structural members consisting of fiber reinforced plastic, which serve as side walls of the freight compartment 3. The lower side of the frame is covered by additional fiber reinforced plastic structural members, which serve as side walls of the freight compartment 3. The lower side of the frame is covered by additional fiber reinforced planar structural members, which form the ceiling of the freight compartment 3.

Based on the right hand side of FIG. 1 the embodiment shown according to the invention provides that the upper floor comprises one piece floor plates extending over nearly the total fuselage inner diameter, which floor plates are connected at their side edges such to the fuselage structure, that in this case predominantly forces acting in the longitudinal direction of the aircraft are transmitted and that the plates are supported near their side edges by planar structural members running vertical, which form the side walls of the freight compartment. Correspondingly, the right hand side half of the FIG. 1 shows a floor plate 12 with an upper cover layer 13 and with lower girths 14, which is supported by the planar support members 15.

FIG. 2 shows a view of a fuselage cross-section with a completely represented floor construction according to the present invention, which essentially comprises the floor plates 12 and the planar structural members 15. The construction is illustrated by way of view III and by way of the detail XI.

Figure 3:
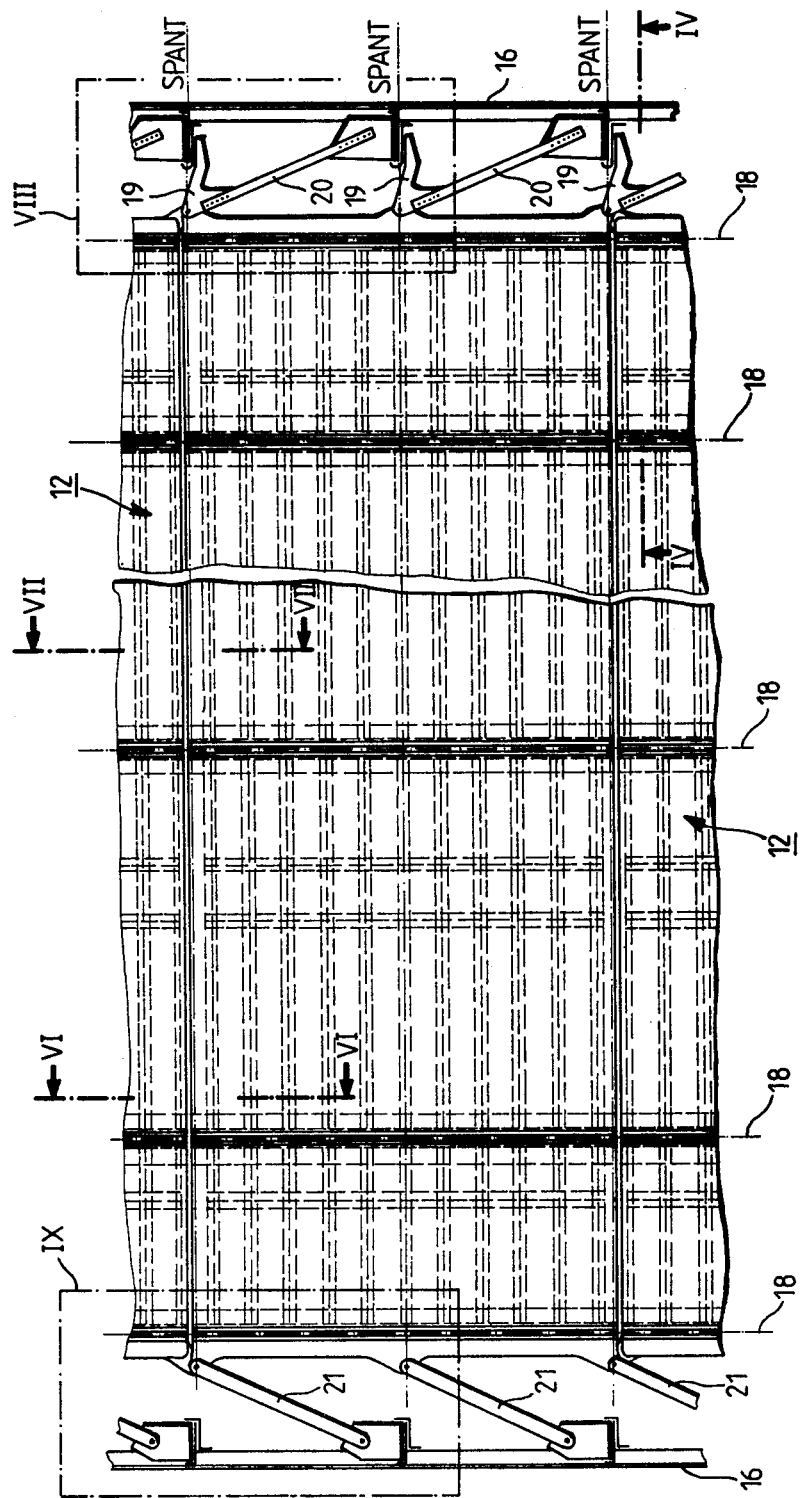
FIG. 3 shows a view in the direction III according to FIG. 2.

Correspondingly, FIG. 3 shows a plan view in the direction III according to FIG. 2 onto the floor plate 12, which extends over two fuselage frame distances in the longitudinal direction of the fuselage and in a cross-direction extends from the left part of the fuselage outer skin 16 to the right part of the fuselage skin. The upper covering layer 13 is stiffened by way of cross and longitudinal support pieces indicated by dashes and running inside the plate, thus forming a plurality of box units. The positions of the seat rails a refixed by the lines 18. The floor plate 12 is on the right hand side of the figure connected to the fuselage outer structure by way of braces 19. The position of the floor plate in cross direction is thus defined. The braces 19 transfer forces only in cross direction. Rods 20 on the right hand side and rods 21 on the left hand side of the floor serve for the transmission of forces acting in the longitudinal direction of the fuselage. The dash-dotted three horizontal straight lines located on the extreme right side of FIG. 2 indicate the positions of the fuselage frames. No provisions corresponding to the braces 19 are provided on the left hand side. Therefor, here the distance between floor and the oppositely disposed fuselage structure can be adjusted without interfering forces. Thus for example the forces acting on the outer skin based on the pressure inside the cabin remain without effect on the floor.

Figure 4:
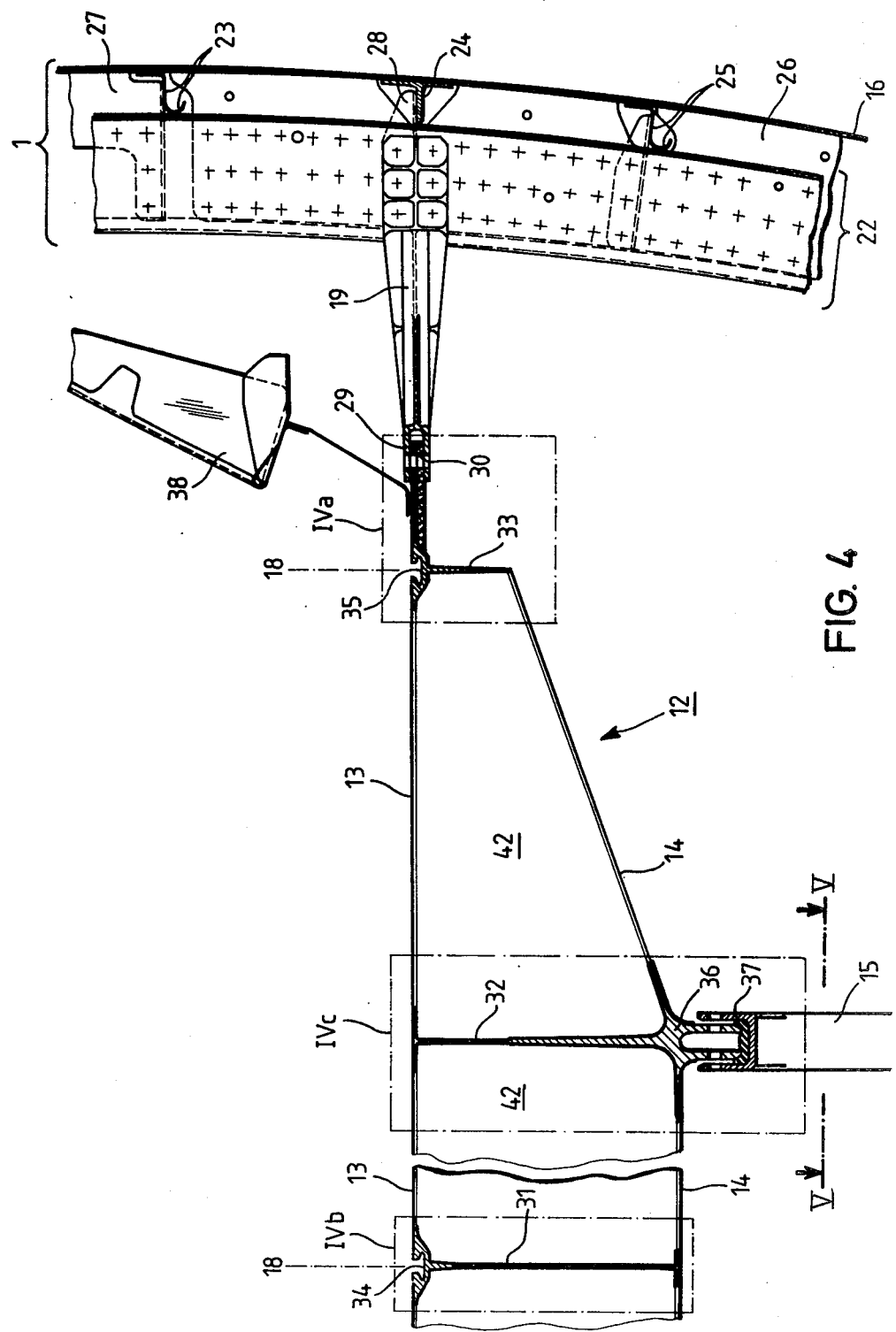
FIG. 4 shows a sectional view along section line IV—IV according to FIG. 3.

The section IV—IV according to FIG. 3 is shown in FIG. 4. Here the connection of the floor plate 12 to the outer structure of the fuselage is shown in more detail. Here the latter substantially comprises the right hand part of the outer skin 16, a fuselage frame profile 22, three stringers 23, 24 and 25 as well as the two shearing metal sheets 26 and 27. The one end of the brace 19 is riveted to the fuselage frame profile 22 and to the shearing metal sheet 26 and is connected via a support angle bracket 28 to the stringer 24. The other end of the brace 19 forms a fork 29, which surrounds an eye 30 disposed at the floor plate 12 and which is connected to it with a bolt not shown here. The section IV—IV shows in addition two longitudinal support pieces 31 and 32 as well as an edge support piece 33 of the floor plate 12 in cross-section and a terminal support piece 42 in an elevational view. The lower edge of the terminal support piece 42 is reinforced with a lower girth 14. The seat support rails 34 and 35 are disposed at the positions determined by the lines 18 and the seat support rails are laminated into the covering layer 13 as well as into the support pieces 31 and 32 with its flange like extensions. The floor plate 12 is connected to the planar structural member 15 via a laminated profile 36, which profile is provided at its upper edge with a U-shaped profile 37. The connection proper is provided by a corresponding number of bolts not shown here. Since the side connections of the floor plates 12 do not transfer any vertical forces, the total load of the floor is supported by the planar support members 15. The in addition shown part 38 is part of the interior panelling and lining of the passenger compartment and does not contribute to the strength of the floor.

Figure 4C:
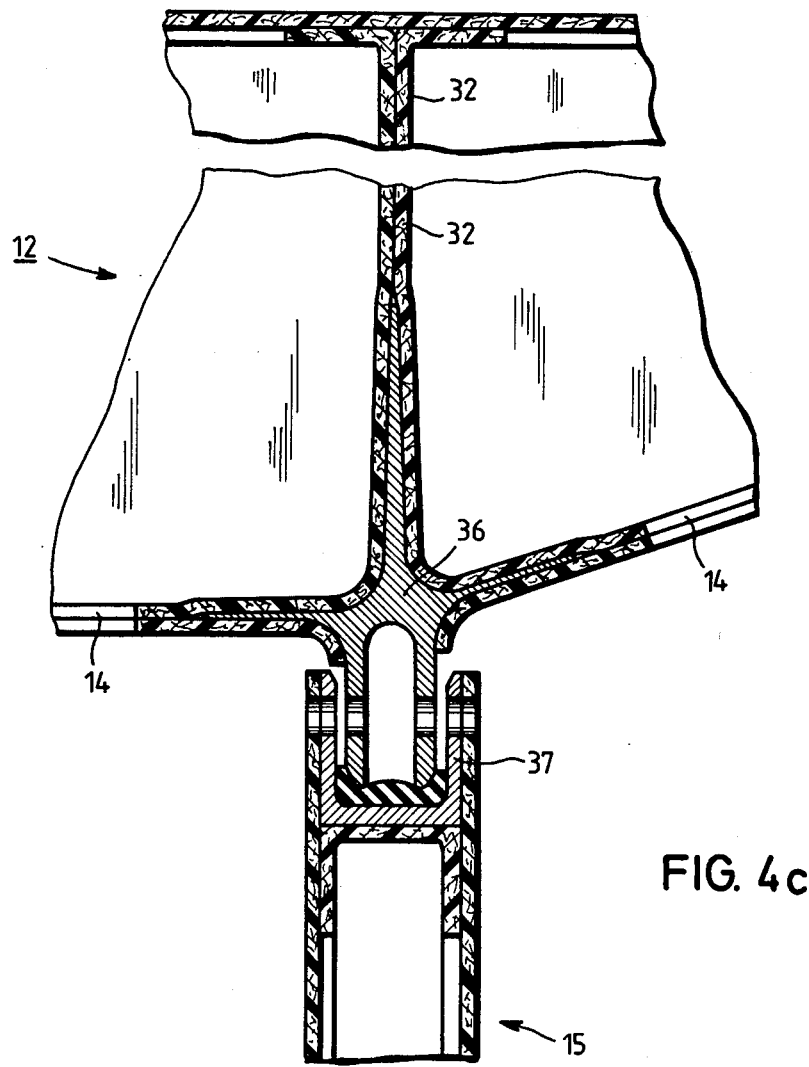

The FIGS. 4a to 4c show a view of details, which cannot easily be recognized from FIG. 4 based on the large reduction in size.

Figure 5:
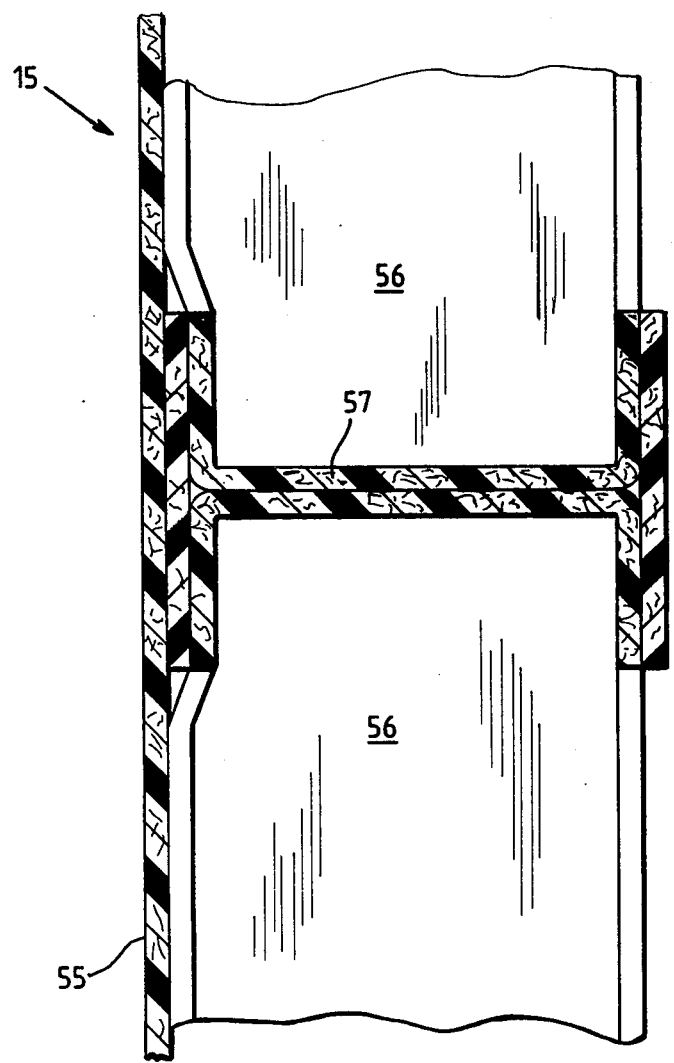
FIG. 5 shows a sectional view of the detail V—V according to FIG. 4.

The section V—V according to FIG. 4 is shown in FIG. 5. The part 15 is constructed like the floor in a box type construction. Accordingly the construction part is provided on the side toward the freight compartment 3 with a closed covering layer 55 comprising fiber reinforced plastic. The rear side of the structural member comprises a fiber reinforced stiffening grid, which comprises horizontal stiffenings 56 and vertical stiffenings 57. Such planar structural members, which also include the floor described above, can be produced by a single adhesive attachment step by employing the described provisions of preimpregnated fiber reinforced plastic material under relatively low labor requirements. The corresponding substantially automated process is known from German Patent Application Laid Open DE-OS No. 3,003,552.

Figure 6:
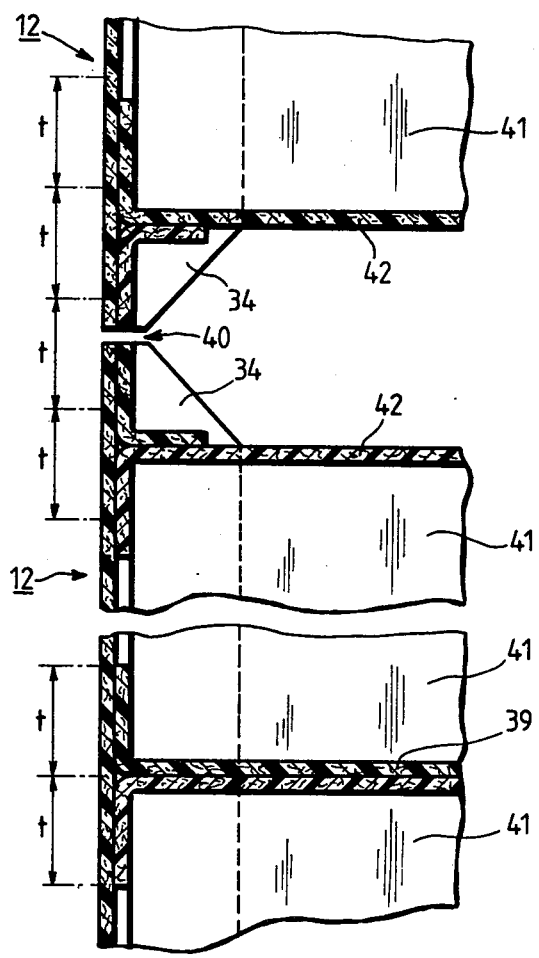
FIG. 6 shows a view of the section VI—VI according to FIG. 3.

The section VI—VI of FIG. 3 is shown in FIG. 6 as a section from two neighboring floor plates 12 with seat support rails 34, cross support piece 39, the longitudinal support pieces 41 as well as two terminal support pieces 42. The construction employed assures that the partition t of the seat support rails matched to the seats to be attached continues uniformly over the slot 40. The slot 40 is closed by way of a sealing profile no shown here.

Figure 7:
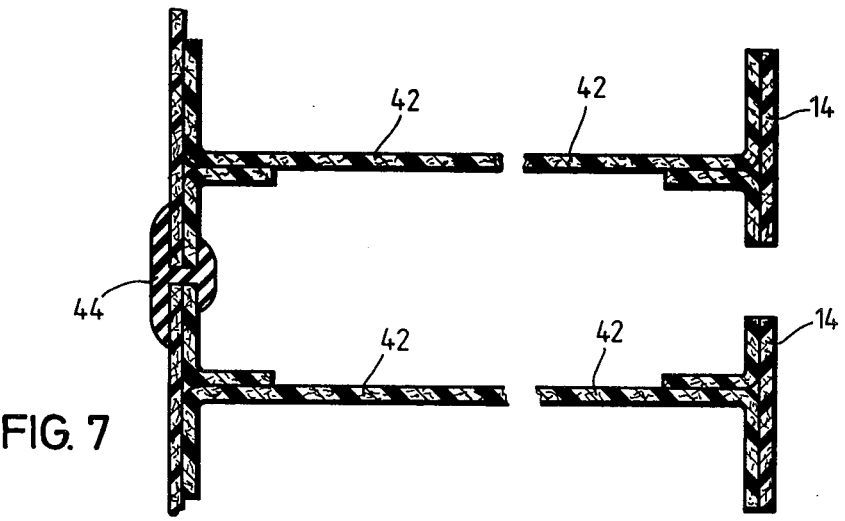
FIG. 7 shows a view of the section VII—VII according to FIG. 3.

Further details of the region between two neighboring floor plates 12 of section VI—VI are shown in FIG. 7. Among other things, here are shown the lower girths 14 of the terminal support piece 42. It can be recognized from this representation that the fields enclosed by the crossing longitudinal and cross support pieces are open at the bottom of the floor plate. Here, a sealing profile 44 with mushroom shaped cross-section is shown inserted into the slot 40.

Figure 8:
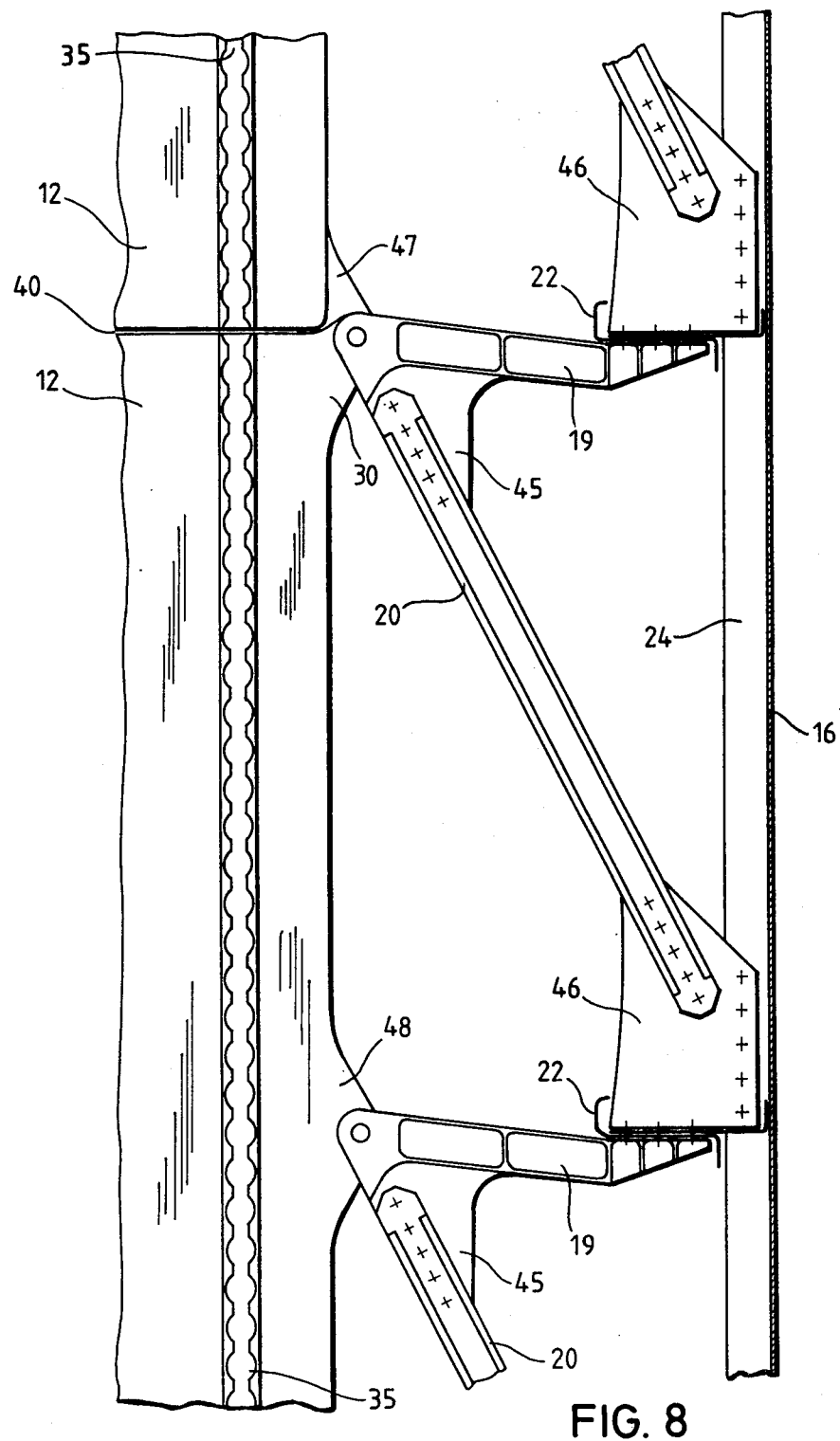
FIG. 8 shows a view of the detail VIII according to FIG. 3.

The detail of FIG. 3 with the right part of the outer skin 16, the stringer 24, the braces 19, the rods 20, the fuselage frame profile 22 with two floor plates 12 as well as the seat support rails 35 is shown in FIG. 8. In each case the one end of a rod 20 is riveted to a plate 45 of the corresponding brace 19. The other end is connected to the junction plate 46 which in turn is connected to a fuselage frame profile 22 and the stringer 24 as shown. Two floor plates 12 are joined to each other at the level of the slot 40. Correspondingly, an eye lug 47 of the front plate 12 and a like eye lug 30 of the rear plate 12 are inserted into the fork of the respective brace 19 and are connected with the brace by way of a bolt not shown here. Corresponding connections exist in each case between a middle eye lug 48 and the respective brace 19.

Figure 9:
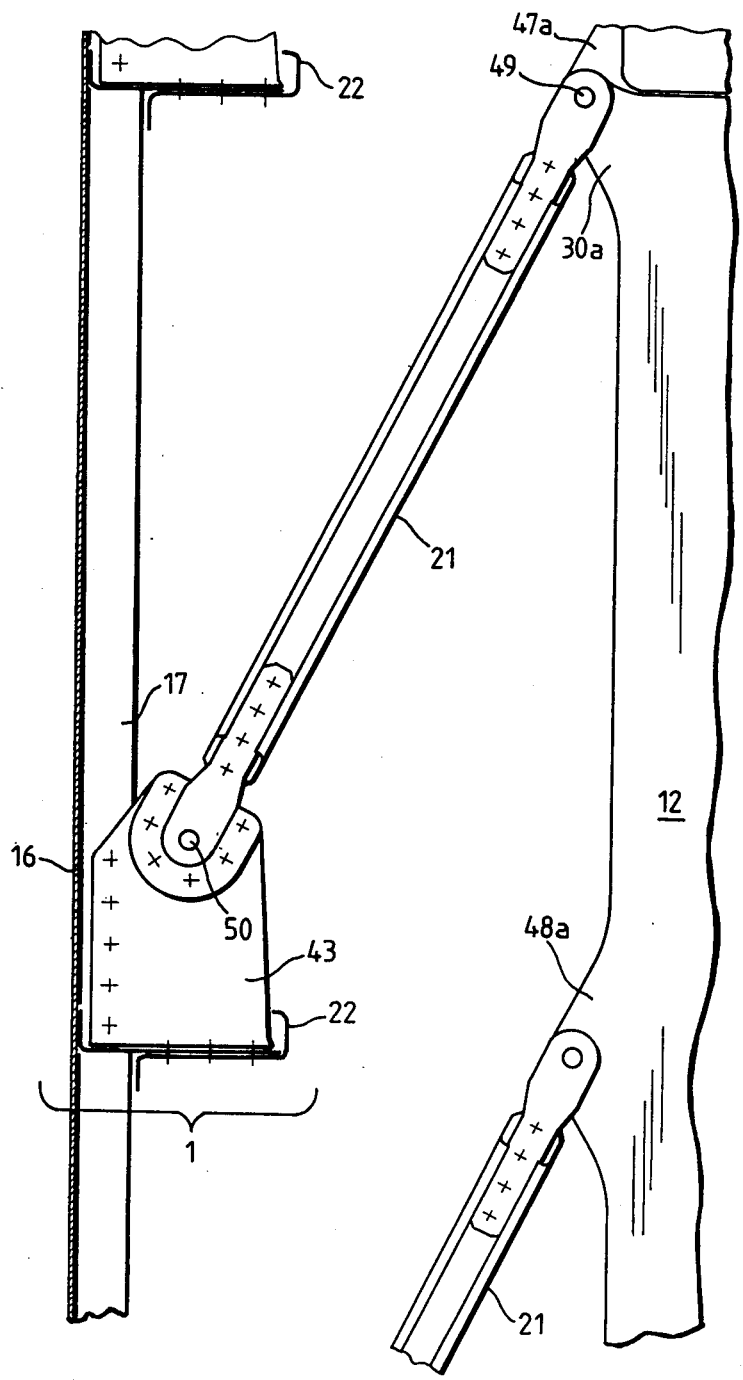
FIG. 9 shows a view of the detail IX according to FIG. 3.

A detail of FIG. 3 is shown in FIG. 9, where the connection of the floor plate 12 to the left side of the fuselage structure, substantially comprising the left part of the outer skin 16, the for practical purposes running around fuselage frame profiles 22 as well as a stringer 24 can be recognized. Here the transfer of forces occurs only via rods 21. Since here a small change between the left edge of the floor plate and the outer structure 16 of the fuselage is permitted, hinge points are provided at the ends of the rods 21. The corresponding bolt connections 49 and 50 connect the rods 21 to the left eye lugs 30a, 47a and 48a of the floor plate 12 on the one hand and to the junction plates 43 on the other hand, which junction plates 43 are riveted to the fuselage frame profiles 22 and to the stringer 24.

Figure 10:
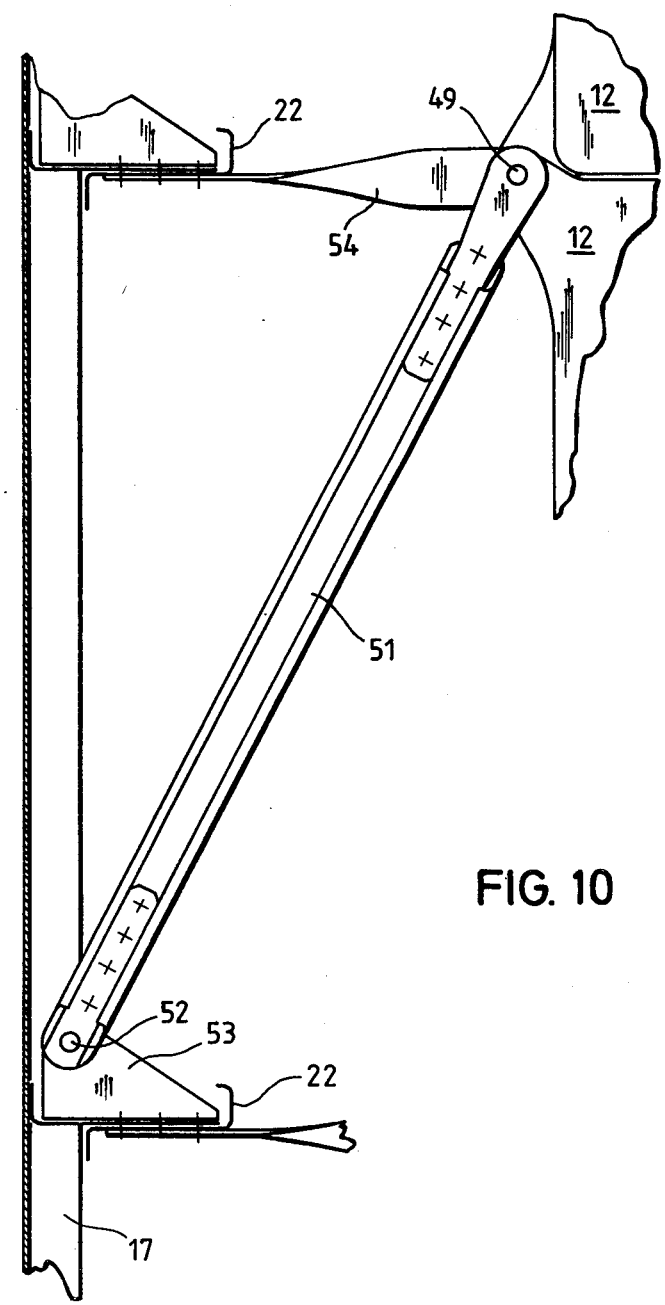
FIG. 10 shows a view of another embodiment of the connections according to FIGS. 8 and 9.

FIG. 10 shows another embodiment of the invention of the connection between the floor plates 12 and the outer structure of the fuselage by way of a rod 51, the one end of which is connected via the bolt conection 49 to the floor plate 12 and the other end of which is connected via a bolt connection 52 to a brace 53 and to the stringer 17. The brace 53 is riveted to the fuselage frame profile 22. This embodiment shows at each fuselage frame position a sheet metal bracket 54, which is on the one hand connected to the corresponding fuselage frame profile 22 as well as to the brace 53 and on the other hand via the bolt connection 49 to the floor plates 12. In this context it is an advantage that the relatively expensive brackets 19 shown in FIG. 4 are substituted by the very simple sheet metal brackets 54. Since the elements recited are also provided at the oppositely disposed floor edge, however in a mirror image position, this results in a reduction of the number of differently formed parts employed in the construction. The required resilience of the connection fuselage to cross-direction results in this embodiment based on the elastic deformation of the brackets 54.

Figure 11A:
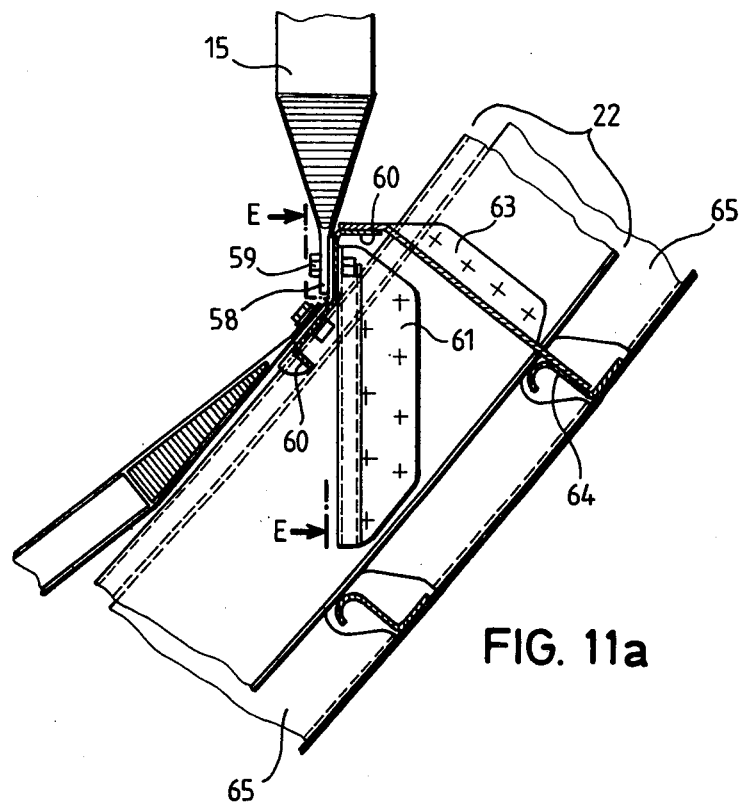
FIG. 11a and FIG. 11b show a view of the detail XI of FIG. 2.
Figure 11B:
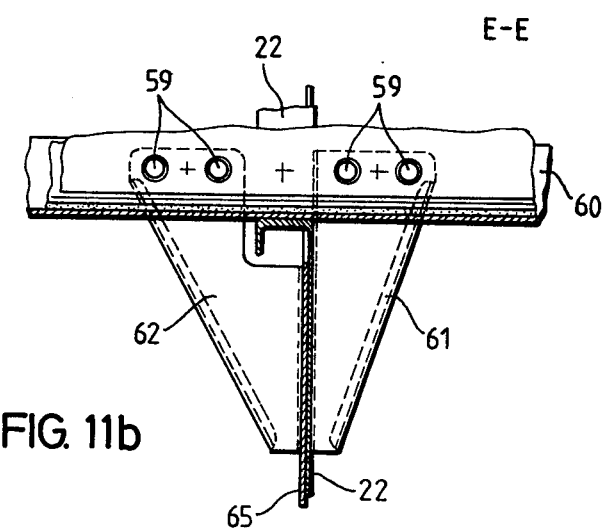

The detail XI of FIG. 2 is shown in FIGS. 11a and 11b. FIG. 11b is a sectional view of the section of FIG. 11a along section line E—E. The connection of the planar structural member 15 to the structure of the fuselage is shown here by way of the example of the right hand freight compartment wall. The part 15 is bordered at the bottom by a relatively thin wall, but sufficiently stiff rim 58. The rim 58 is connected to a support on the side of the fuselage by way of four bolts or screws 59, where the support is substantially formed from a longitudinal profile 60 running from fuselage frame to fuselage frame, two stiffenings 61 and 62 as well as a support angle plate 63. The reinforcing stiffenings 61 and 62 are riveted to a fuselage frame profile 22 and to a shearing metal sheet 65 on the one hand and to the longitudinal profile 60 on the other hand. Such attachments are provided at each fuselage frame location. The planar structural members 15 extend in the fuselage longitudinal direction over three to four fuselage frame distances and they are connected at their joints by a few screw or bolt connections not shown in the FIG.

The floor plates 12 as well as the planar structural members 15 shown here only by way of example and serving for the building of the invention floor construction can be formed in a variety of ways. Thus it is conceivable that the open lower side of the floor plate 12 showing the stiffening grid is closed by way of covering layer comprising fiber reinforced plastics. A further embodiment of the floor plates 12 comprises that the floor plates are furnished with provisions in each case located at a junction point of oppositely disposed regions of two neighboring floor plates, such that thereby several screw or bolt connections can be provided.

The planar structural members 15 employed in accordance with the invention can be constructed according to all principles of constructions known for such parts, without that this would be beyond the scope of the present invention. Thus there result additional embodiments, of which only a few are illustrated by way of example.

Figure 12A:
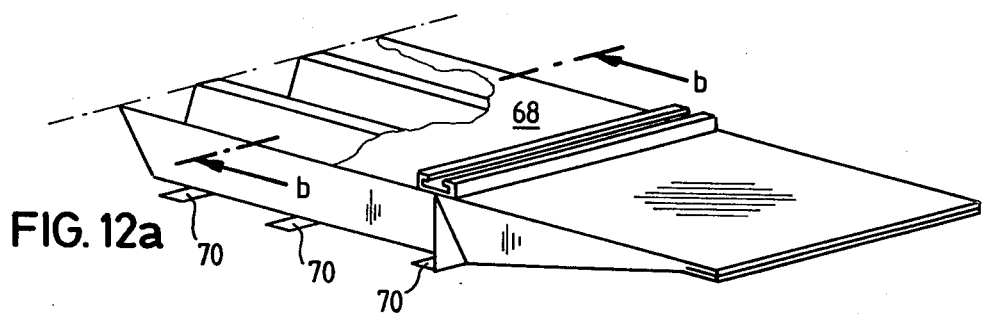
FIG. 12a, FIG. 12b, and FIG. 12c show a view of a floor pate in profile construction.
Figure 12B:
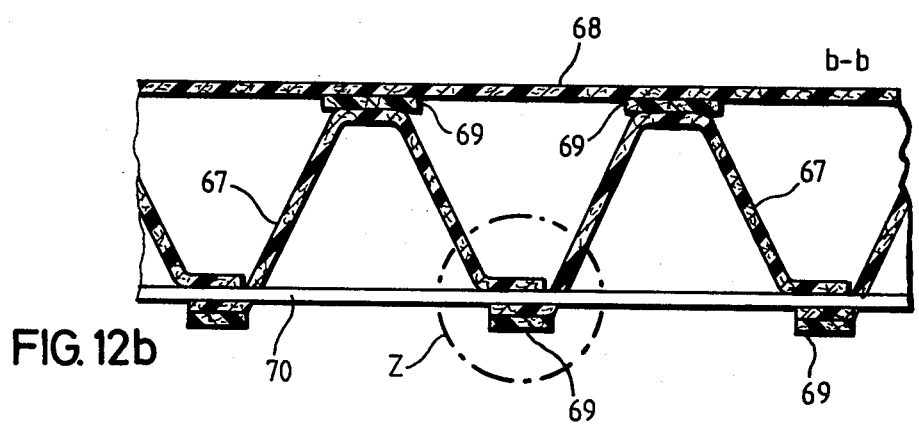
Figure 12C:
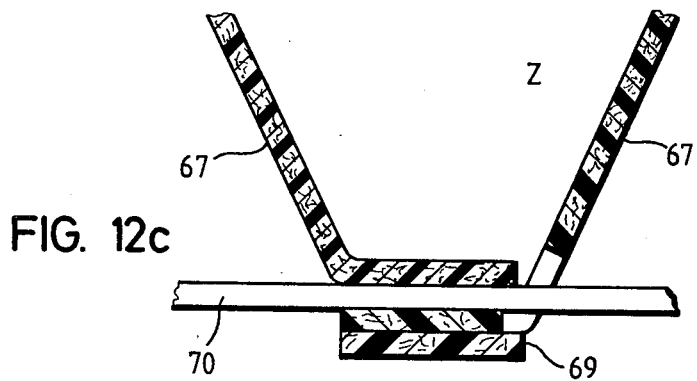

Thus FIGS. 12a to 12c show the principles of construction of a floor plate in profile construction. FIG. 12b shows a sectional view of the embodiment of FIG. 12a as seen along section line b—b of FIG. 12a. FIG. 12c is an enlarged view of the detail "Z" shown in FIG. 12b. A-shaped profiles 67 are adhesively attached covering layer 68. The profiles 67 are in each case attached to each other at their adhesively covered surfaces and are provided here in each case with a girth 69. The lower edges of the profiles 67 are connected to each other via cross-ties or transverse bracing 70 for increasing the bending strength in the transverse direction. Instead of the cross-ties or transverse bracing 70 there can also be provided a lower fiber reinforced plastic covering layer.

Figure 13A:
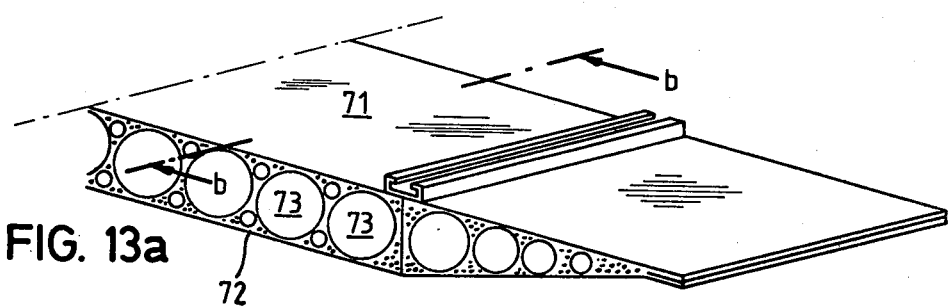
FIG. 13a, FIG. 13b, and FIG. 13c show a view of a floor plate in tubular construction.
Figure 13B:
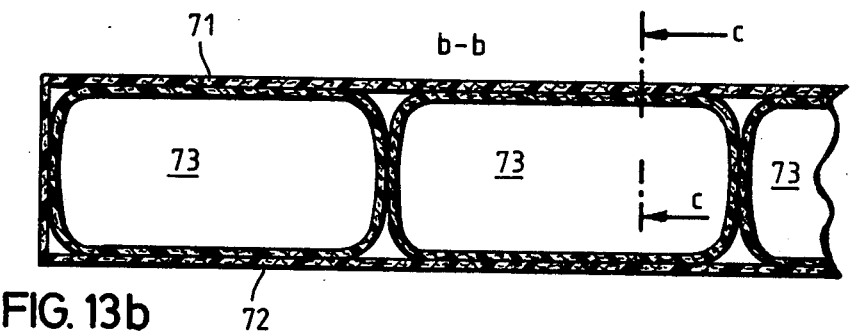
Figure 13C:
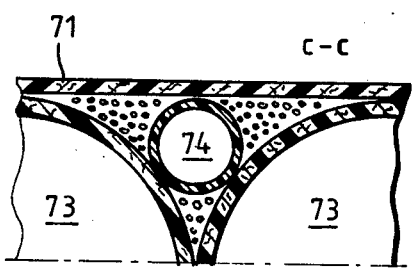

The FIGS. 13a to 13c show the construction in principle of a floor plate in tubular construction. FIG. 13b is a sectional view of the embodiment of FIG. 13a as seen along section line b—b of FIG. 13a. FIG. 13c is a sectional view of the embodiment of FIG. 13b as seen along section line c—c of FIG. 13b. The space located between an upper covering layer 71 and a lower covering layer 72 is filled here with tube-shaped hollow bodies 73. The then remaining space between the covering layers is filled with a rigid expanded plastic or rigid foam such as obtainable from polyurethanes.

Figure 14A:
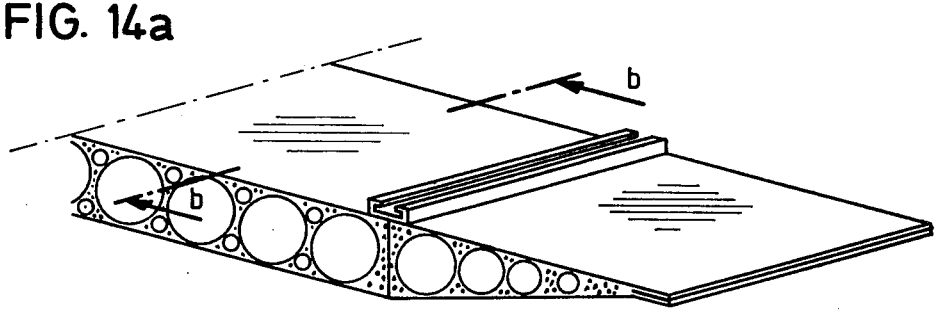
FIG. 14a, FIG. 14b, and FIG. 14c show a view of a floor plate in ball construction.
Figure 14B:
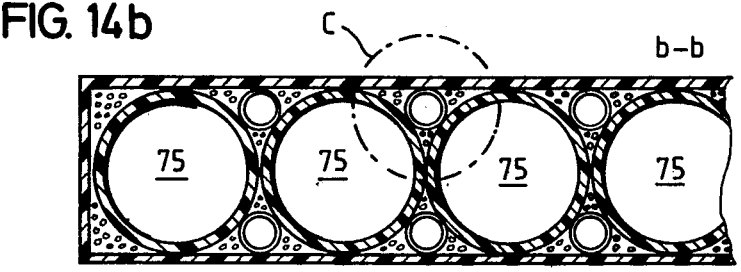
Figure 14C:
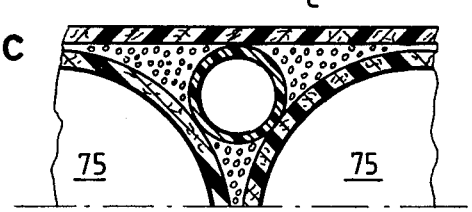

The FIGS. 14a to 14c finally show the construction in principle of a floor plate in ball construction. FIG. 14b is a sectional view of FIG. 14a as seen along section line b—b of FIG. 14a. FIG. 14c is an enlarged view of a detail "C" of FIG. 14b. This embodiment corresponds substantially to the one of FIG. 13, however with the difference that the embedded hollow bodies have the form of balls 75 in the present case.

The invention can be realized by way of several materials available to the person skilled in the art, which can be employed in accordance with their respective desired properties. Materials of particular interest include plastics with embedded fibers from carbon (carbon fiber reinforced plastics), glass (glass fiber reinforced plastics), aramid (aramid fiber reinforced plastics) or cotton. The selection is performed according to usual technical considerations and the result could be for example that the longitudinal girths are provided from carbon fiber reinforced plastics and the shearing fields are provided from glass fiber reinforced plastics. Furthermore, the person skilled in the art can determine without difficulty the optimal direction of the fibers in order to provide the strength desired.

It will be understood that each of the elements described above, or two or more together, may also find a useful application in other types of floor system configurations and support providing procedures differing from the types described above.

While the invention has been illustrated and described as embodied in the context of a floor construction for the upper compartment of an aircraft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A floor construction for the upper compartment of an aircraft having an about circular fuselage cross-section comprising a one piece floor plate providing bending supports and extensing over nearly the full inner diameter of the fuselage;

a connection provided between the edge of the floor plate and the fuselage outer structure for transmitting forces directed predominantly in the longitudinal direction of the air craft and substantially eliminating transversely directed forces through the floor structure; and vertically running planar structural members providing side support elements for the floor plate.

2. The floor construction for the upper compartment of an aircraft according to claim 1 wherein the connection provided between an edge of the floor plate and the fuselage outer structure for transmitting forces directed predominantly in the longitudinal direction of the aircraft comprises substantially rods.

3. The floor construction for the upper compartment of an aircraft according to claim 2 wherein the rods are connected via hinge points to the floor plate and to the fuselage outer structure.

4. The floor construction for the upper compartment of an aircraft according to claim 1 wherein the connection between an edge of the floor plate and the fuselage outer structure comprises a brace.

5. The floor construction for the upper compartment of an aircraft according to claim 4 wherein the floor plate is provided with an eye at its end to be bolted to a forked end of a brace.

6. The floor construction for the upper compartment of an aircraft according to claim 1 wherein the connection between an edge of the floor plate and the fuselage outer structure comprises sheet metal brackets.

7. The floor construction for the upper compartment of an aircraft according to claim 1 wherein the floor plates comprise fiber reinforced plastics.

8. The floor construction for the upper compartment of an aircraft according to claim 1 wherein the one piece floor plates extending nearly over the full diameter of the fuselage are provided with rails running about parallel to the longitudinal axis of the fuselage.

9. The floor construction for the upper compartment of an aircraft according to claim 1 wherein the one piece floor plates are reinforced by longitudinal support pieces, by an edge support, and by a terminal support piece reinforced by a lower girth.

10. The floor construction for the upper compartment of an aircraft according to claim 1 wherein the floor plate comprises a profile to rest on the planar structural members and wherein the planar structural members have a U-shaped profile at their upper end to engage the profile of the floor plate.

11. The floor construction for the upper compartment of an aircraft according to claim 1 further comprising a mushroom shaped sealing profile providing a connection between adjoining sides of the floor plates.

12. The floor construction for the upper compartment of an aircraft according to claim 1 wherein the planar structural members are provided with a stiff rim at their lower end, which rim is attached to a longitudinal profile running from fuselage frame to fuselage frame.

13. The floor construction for the upper compartment of an aircraft according to claim 1 wherein the floor plate is supported by a truss core.

14. The floor construction for the upper compartment of an aircraft according to claim 1 wherein the floor plate is supported by a tube core in combination with rigid foam.

15. The floor construction for the upper compartment of an aircraft according to claim 1 wherein the floor plate is supported by a core of balls in combination with rigid foam.

16. A method for constructing a floor for an upper compartment of an aircraft comprising providing a vertically running planar structural member as side support element for a floor plate of the upper compartment;

placing one piece floor plates onto the vertically running planar structural members where the floor plates provide bending supports and extend over nearly the full inner diameter of the fuselage; and connecting an edge of the floor plate and the fuselage outer structure for transmitting forces directed predominantly in the longitudinal direction of the aircraft and substantially eliminating transversely directed forces through the floor structure.

17. The method for constructing a floor according to claim 16 further comprising connecting rods as intermediary between the floor plate and the fuselage and where the rods are connected via hinge points to the fuselage outer structure.

18. The method for constructing a floor according to claim 16 further comprising engaging braces provided as connection between the floor plate and the fuselage by way of forked ends to eyes provided at the floor plate.

19. The method for constructing a floor according to claim 1 further comprising setting a profile disposed at the bottom side of the floor plate into a U-shaped profile at the upper end of the planar structural member.

20. The method for constructing a floor according to claim 16 further comprising placing a mushroom shaped sealing profile as a connection between adjoining sides of floor plates.

21. The method for constructing a floor according to claim 16 further comprising attaching stiff rims disposed at the lower end of the planar structural members to a longitudinal profile running from fuselage frame to fuselage frame.

* * * * *